(12) United States Patent
Huynh-Ba et al.

(10) Patent No.: US 8,293,321 B2
(45) Date of Patent: Oct. 23, 2012

(54) COATING COMPOSITIONS HAVING IMPROVED EARLY HARDNESS

(75) Inventors: Gia Huynh-Ba, Hockessin, DE (US); Patrick Henry Corcoran, Cherry Hill, NJ (US)

(73) Assignee: E I du Pont de Nemours and Company, Wilmington, DE (US)

( * ) Notice: Subject to any disclaimer, the term of this patent is extended or adjusted under 35 U.S.C. 154(b) by 80 days.

(21) Appl. No.: 12/983,939

(22) Filed: Jan. 4, 2011

(65) Prior Publication Data

US 2011/0111117 A1  May 12, 2011

Related U.S. Application Data

(62) Division of application No. 11/704,014, filed on Feb. 7, 2007, now Pat. No. 7,888,431.

(60) Provisional application No. 60/772,009, filed on Feb. 10, 2006.

(51) Int. Cl.
 *B05D 7/14* (2006.01)
 *B05D 3/10* (2006.01)

(52) U.S. Cl. ........ 427/140; 427/142; 525/124; 525/131; 525/123; 524/589

(58) Field of Classification Search ................... 427/140, 427/142; 524/589; 525/124, 131, 123
See application file for complete search history.

(56) References Cited

U.S. PATENT DOCUMENTS

| | | | |
|---|---|---|---|
| 3,808,162 A | 4/1974 | Allen et al. | |
| 4,341,689 A | 7/1982 | Doshi et al. | |
| 4,687,813 A * | 8/1987 | Lenz et al. | 525/131 |
| 5,023,294 A | 6/1991 | Cozzie et al. | |
| 5,279,862 A | 1/1994 | Corcoran et al. | |
| 5,286,782 A | 2/1994 | Lamb et al. | |
| 5,354,797 A | 10/1994 | Anderson et al. | |
| 5,508,349 A | 4/1996 | Clark et al. | |
| 5,552,487 A | 9/1996 | Clark et al. | |
| 5,633,362 A | 5/1997 | Nagarajan et al. | |
| 5,686,276 A | 11/1997 | Laffend et al. | |
| 5,753,756 A | 5/1998 | Aerts et al. | |
| 5,821,092 A | 10/1998 | Nagarajan et al. | |
| 5,990,192 A | 11/1999 | Gerlitz et al. | |
| 6,069,203 A | 5/2000 | Henry et al. | |
| 6,221,494 B1 | 4/2001 | Barsotti et al. | |
| 6,472,493 B1 | 10/2002 | Huynh-Ba | |
| 6,566,481 B2 | 5/2003 | Bruchmann et al. | |
| 6,624,239 B1 | 9/2003 | Bendix et al. | |
| 6,677,425 B2 * | 1/2004 | Huynh-Ba | 528/49 |
| 6,740,726 B2 | 5/2004 | Henkelmann et al. | |
| 6,806,314 B2 | 10/2004 | Fenn et al. | |
| 6,887,937 B1 | 5/2005 | Vandevoorde et al. | |
| 2002/0007043 A1 | 1/2002 | Sunkara et al. | |
| 2002/0010374 A1 | 1/2002 | Sunkara et al. | |
| 2004/0030038 A1 | 2/2004 | Woltering et al. | |
| 2004/0039112 A1 | 2/2004 | Fenn et al. | |
| 2004/0192817 A1 | 9/2004 | Staunton et al. | |

FOREIGN PATENT DOCUMENTS

| | | |
|---|---|---|
| EP | 1227895 | 8/2002 |
| JP | 1092276 | 4/1989 |
| WO | 9403516 | 2/1994 |
| WO | 9620968 A1 | 7/1996 |
| WO | WO 9853013 A1 * | 11/1998 |
| WO | 9923131 A1 | 5/1999 |
| WO | 2004041894 A1 | 5/2004 |

OTHER PUBLICATIONS

Cheng-Kung Liu et al, J. Polymer Sci., Polymer Chemistry Ed. 28 449-465 (1985).

* cited by examiner

*Primary Examiner* — Satya Sastri
(74) *Attorney, Agent, or Firm* — Gann G. Xu

(57) ABSTRACT

A fast hardening clear coating composition for repairing a clear coat/color coat finish or a pigmented mono-coat of a vehicle comprising a film forming binder and an organic liquid carrier, where the binder contains a hydroxyl polymer component comprising (A) hydroxyl-containing acrylic polymer, (B) at least one hydroxyl-terminated component selected from the group consisting of (1) an organic diol having the formula

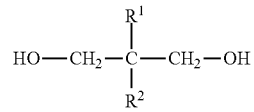

where $R^1$ and $R^2$ are individually selected from the group of hydrogen and an alkyl group having 1, 3-5 carbon atoms and (2) a hydroxyl terminated reaction product of trimethylol propane and a lactone; (C) an organic polyisocyanate crosslinking component, at least portion of which comprises a trimer of isophorone diisocyanate or hexamethylene diisocyanate and the composition further contains, a curing catalyst, of a dialkyl tin aliphatic carboxylate, a tertiary aliphatic mono or diamine, an aliphatic carboxylic acid, and optionally, a zinc or calcium organic acid salt in an effective amount such that the coating composition on curing at ambient temperatures is in a water spot free and sufficiently hard state for sanding or buffing within about 2 hours after application or on cool down when baked under normal conditions.

2 Claims, No Drawings

COATING COMPOSITIONS HAVING IMPROVED EARLY HARDNESS

CROSS-REFERENCE TO RELATED APPLICATION

This application is a divisional of U.S. application Ser. No. 11/704,014, filed on Feb. 7, 2007 now 7,888,431, now allowed, which claims priority under 35 U.S.C. §119 from U.S. Provisional Application Ser. No. 60/772,009, filed Feb. 10, 2006.

BACKGROUND OF THE INVENTION

This invention relates to solvent based coating compositions and in particular to a clear coating composition for refinishing clear coat/color coat finishes of vehicles, such as, automobiles or trucks. Also, the coating composition can be pigmented and used to refinish mono-coated vehicles.

Clear coat/color coat finishes for automobiles and trucks have been used in recent years and are currently being used. Typically, such finishes are produced by a wet-on-wet method, in which the color coat or basecoat which is pigmented is applied and flash dried for a short period of time but not cured and then the clear coat, which provides protection for the color coat and improves the appearance of the overall finish, such as, gloss and distinctness of image, is applied thereover and both the color coat and the clear coat are cured together.

Repair of such clear coat/color coat finishes that have been damaged, e.g., in a collision, has been difficult in that the clear coat refinish compositions in current use, for example, as taught in Corcoran et al. U.S. Pat. No. 5,279,862, issued Jan. 18, 1994, Lamb et al. U.S. Pat. No. 5,286,782, issued Feb. 15, 1994, Anderson et al. U.S. Pat. No. 5,354,797, issued Oct. 11, 1994, and Huynh-Ba U.S. Pat. No. 6,472,493 issued Oct. 29, 2002 have acceptable drying times suitable for automotive refinish, i.e., to a dust free state, but nonetheless take many hours to cure to a sufficiently hard and water resistant state at ambient or slightly elevated temperatures. As a result, the vehicle cannot be moved outside of the autobody repair facility to free work space in the autobody repair facility without the risk of water spotting nor can the clear coat be sanded (wet or dry) or buffed to a high gloss finish on the same day of application. Thus, the productivity of a refinish operation is still lacking, since the vehicles cannot be stored outside or worked on quickly after application of the finish.

One approach used to improve the initial hardness and water resistance of a clear coat composition on curing involves the use of high levels of a tin catalyst; however, such high levels produce certain unwanted side effects, such as, reduced pot life and increased "die-back". Die-back mainly occurs as the film is formed before all solvents are evaporated. The solvents that are trapped create a stress on the film as they eventually flash away, which distorts or wrinkles the film and converts it almost overnight from an attractive high gloss mirror-like finish into a film having a dull fuzzy appearance and poor gloss and distinctness of image.

A continuing need still exists for a coating composition, preferably, a low VOC (Volatile Organic Content) coating composition, suited for use as a clear coat in automotive refinishing that offers high film hardness and water resistance in a very short period of time when cured at ambient or slightly elevated temperatures, with little or no pot life reductions and die-back consequences, so that a vehicle can be moved or worked on quickly after application of the coating composition.

SUMMARY OF THE INVENTION

The invention is directed to a coating composition having improved early hardness and water resistance, containing a film forming binder and a volatile organic liquid carrier for the binder; the binder contains
(A) a hydroxyl polymer component comprising at least one hydroxyl-containing acrylic polymer;
(B) at least one hydroxyl-terminated component selected from the group consisting of (1) an organic diol having the formula

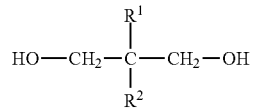

where $R^1$ and $R^2$ are individually selected from the group of hydrogen and an alkyl group having 1, 3-5 carbon atoms and (2) a hydroxyl terminated reaction product of trimethylol propane and a lactone; and
(C) an organic polyisocyanate component, at least a portion of which comprises a trimer of isophorone diisocyanate or a trimer of hexamethylene diisocyanate and any mixtures of these two trimers; wherein the ratio of equivalents of isocyanate per equivalent of hydroxyl groups in the binder is in the range of about 0.7/1 to 2.0/1; and
wherein the composition further contains
(D) a catalyst system for the binder comprising
  (i) at least one organotin compound,
  (ii) at least one tertiary amine,
  (iii) at least one organic carboxylic acid; and
  (iv) optionally, at least one organic acid salt which may be zinc organic acid salts or calcium organic salts or mixtures thereof;
wherein the coating composition cures at ambient temperatures to a water spot free state within 2 hours after application.

The present invention also provides an improved process for repairing a clear coat/color coat finish or a pigmented mono-coat finish of a vehicle using the aforesaid coating composition as a refinish composition which process allows the vehicle to be moved outside the repair area and the finish to be sanded (wet or dry), buffed or polished, if necessary, to remove minor imperfections and enhance gloss within a short period of time after application, which greatly improves the efficiency of a refinish operation by allowing more vehicles to be processed in the same or in less time.

DETAILED DESCRIPTION OF THE INVENTION

The features and advantages of the present invention will be more readily understood, by those of ordinary skill in the art, from reading the following detailed description. It is to be appreciated those certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both preceded by the word "about." In this manner, slight variations above and below the stated ranges can be used to achieve substantially the same results as values within the ranges. Also, the disclosure of these ranges is intended as a continuous range including every value between the minimum and maximum values.

All patents, patent applications and publications referred to herein are incorporated by reference in their entirety.

The term "binder" as used herein refers to the film forming constituents of the composition, such as polymers, and includes any crosslinking components, such as, polyisocyanates, other polymeric and/or oligomeric components, and optional reactive diluents. Solvents, pigments, catalysts, antioxidants, U.V. absorbers, light stabilizers, leveling agents, antifoaming agents, anti-cratering agents and adhesion promoting agents are not included in the term.

Molecular weight (both number and weight average) is determined by gel permeation chromatography utilizing a high performance liquid chromatograph supplied by Hewlett-Packard, Palo Alto, Calif. and unless otherwise stated the liquid phase used was tetrahydrofuran and the standard was polymethyl methacrylate or polystyrene.

"Tg" (glass transition temperature) is in ° C. and determined by Differential Scanning Calorimetry or calculated according to the Fox Equation.

The coating composition of this invention preferably is a low VOC composition that is particularly suited for use as a clear coat in automotive refinishing. The composition contains a film forming binder and an organic liquid carrier which is usually a solvent for the binder. In a low VOC composition, the amount of organic solvent used in the liquid carrier portion results in the composition having a VOC content of less than 0.6 kilograms per liter (5 pounds per gallon) and preferably, in the range of about 0.25-0.53 kilograms per liter (2.1-4.4 pounds per gallon) of organic solvent, as determined under the procedure provided in ASTM D-3960.

Typically, the coating composition has a film forming binder content of about 25-90% by weight and an organic liquid carrier content of about 10-75% by weight and preferably, about 35-55% by weight binder and 45-65% by weight carrier.

The binder contains hydroxyl components comprising at least one hydroxyl polymer component of a hydroxyl containing acrylic polymer and at least one hydroxyl-terminated component that is either (1) an organic diol having the formula

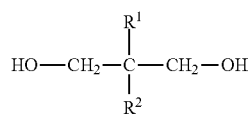

where $R^1$ and $R^2$ are individually selected from the group of hydrogen and an alkyl group having 1, 3-5 carbon atoms or (2) a hydroxyl terminated reaction product of trimethylol propane and a lactone; and an organic polyisocyanate crosslinking component, which is capable of reacting with the hydroxyl components to form urethane linkages.

The hydroxyl components of the binder of the coating composition contain about 50-98% by weight of the hydroxyl polymer component (A) and about 2-50% by weight of the hydroxyl-terminated component (B). The total percentage of these hydroxyl-containing components is equal to 100%.

The organic polyisocyanate component of the binder contains at least a portion of a trimer of isophorone diisocyanate or a trimer of hexamethylene diisocyanate or a mixture of these two trimers. Preferably, the organic polyisocyanate component contains about 50%-100% by weight of a trimer of hexamethylene diisocyanate and about 0 to 50% by weight of a trimer of isophorone diisocyanate. More preferably, the organic polyisocyanate contains 50%-95% by weight of the trimer of hexamethylene diisocyanate and 5%-50% of the trimer of isophorone diisocyanate. The total percentage of polyisocyanates is equal to 100%.

The hydroxyl and polyisocyanate components are generally employed in an equivalent ratio of isocyanate groups to hydroxyl groups of about 0.7/1 to 2.0/1, preferably, in the range of about 1/1 to 1.5/1.

The hydroxyl polymer component, i.e., the acrylic polymer typically is prepared by conventional solution polymerization techniques in which monomers, solvents and polymerization catalyst are charged into a conventional polymerization reactor and heated to about 60-200° C. for about 0.5-6 hours to form a polymer having a weight average molecular weight (Mw) of about 2,000-20,000, preferably about 3,000-11,000.

The acrylic polymer thus formed has a glass transition temperature (Tg) generally of at least 10° C. to 90° C. and preferably, about 40-80° C.

Typically useful polymerization catalysts are azo type catalysts, such as, azo-bis-isobutyronitrile, 1,1'-azo-bis(cyanocylohexane), acetates, such as, t-butyl peracetate, peroxides, such as, di-t-butyl peroxide, benzoates, such as, t-butyl perbenzoate, octoates, such as, t-butyl peroctoate and the like.

Typical solvents that can be used are ketones, such as, methyl amyl ketone, methyl isobutyl ketone, methyl ethyl ketone, aromatic hydrocarbons, such as, toluene, xylene, alkylene carbonates, such as, propylene carbonate, n-methylpyrrolidone, ethers, ester, such as, butyl acetate, and mixtures of any of the above.

The hydroxyl containing acrylic polymer is preferably composed of polymerized monomers of styrene, substituted styrene, an alkyl methacrylate, such as, methyl methacrylate, isobornyl methacrylate, cyclohexyl methacrylate or a mixture of these monomers, a second (meth)acrylate monomer, such as, n-butyl methacrylate, isobutyl methacrylate, isoborny acrylate or ethyl hexyl methacrylate or a mixture of these monomers and a hydroxy alkyl methacrylate or acrylate that has 1-8 carbon atoms in the alkyl group, such as, hydroxy ethyl methacrylate, hydroxy propyl methacrylate, hydroxy butyl methacrylate, hydroxylethyl hexyl methacrylate, hydroxy ethyl acrylate, hydroxy propyl acrylate, hydroxy butyl acrylate hydroxylethyl hexyl acrylate and the like. The acrylic polymer can also contain methacrylic acid or acrylic acid that is further reacted with an epoxy component, such as, Cardura®10 glycidyl ether supplied by from Exxon Chemicals.

One useful hydroxyl containing acrylic polymer comprises a blend of hydroxyl acrylic polymers of about 5 to 50% by weight of a hydroxyl acrylic polymer having a weight average molecular weight of above 10,000 to 20,000, 20 to 60% by weight, of a second hydroxyl acrylic polymer having a weight average molecular weight of above 7,000 up to 10,000 and 20-70% by weight of a third hydroxyl acrylic polymer having a weight average molecular weight of 2,000 up to 7,000, wherein the percentage of the three components of the blend of the hydroxyl acrylic polymers is equal to 100%.

One preferred hydroxyl containing acrylic polymer contains about 5-30% by weight styrene, 1-50% by weight of the methacrylate, such as, methyl methacrylate and/or ethyl hexyl methacrylate, 30-60% by weight of the second methacrylate, such as, isobutyl or isobornyl methacrylate or isobornyl acrylate and 10-40% by weight of the hydroxy alkyl methacrylate, such as, hydroxylethyl methacrylate or hydroxyl butyl acrylate. The total percentage of monomers in the polymer equals 100%.

One particularly preferred acrylic polymer contains the following constituents in the above percentage ranges: styrene, methyl methacrylate, 2-ethyl hexyl methacrylate, isobutyl methacrylate, hydroxy ethyl methacrylate and/or hydroxyl butyl acrylate. Another particularly preferred acrylic polymer contains the following constituents in the above percentage ranges: styrene, methyl methacrylate, isobutyl methacrylate, isobornyl (meth)acrylate, 2-ethyl hexyl methacrylate, hydroxy ethyl methacrylate, hydroxyl butyl acrylate. Most preferably, compatible blends of two or three of the above acrylic polymers are used.

Optionally, the acrylic polymer can contain about 0.5-2% by weight of acrylamide or methacrylamide, such as, n-tertiary butyl acrylamide or methacrylamide.

In addition to the hydroxyl polymer component (A), the binder optionally can contain up to 50% by weight, based on the weight of the hydroxyl polymer component, of hydroxyl terminated oligomer(s) having a weight average molecular weight (Mw) not exceeding about 2,000, preferably, about 200-2,000, and a polydispersity of less than about 1.7.

Typically useful oligomers are polyester oligomers including caprolactone oligomers containing terminal hydroxyl groups which may be prepared by initiating the polymerization of caprolactone with a cyclic polyol, particularly a cycloaliphatic polyol, in the presence of a tin catalysts via conventional solution polymerization techniques. Such caprolactone oligomers are well known and described at length in Anderson et al. U.S. Pat. No. 5,354,797, issued Oct. 11, 1994, hereby incorporated by reference. Epsilon(c)-caprolactone is typically employed as the caprolactone component in a 1/1 to 5/1 molar ratio with a cycloaliphatic diol. Typically useful cycloaliphatic polyol monomers include 1,4-cyclohexanediol, 1,4-cyclohexane dimethanol, and 2,2'-bis (4-hydroxycyclohexyl) propane. Preferred caprolactone oligomers are formed from caprolactone and 1,4-cyclohexanedimethanol reacted in a molar ratio of 2/1 to 3/1.

Polytrimethylene ether diol is another oligomer that can be used in the coating composition. The polytrimethylene ether diol is prepared by an acid-catalyzed polycondensation of 1,3-propanediol, preferably, as described in US. Published Patent Application Numbers 2002/0007043 A1 and 2002/0010374 A1, both of which are hereby incorporated by reference. The polytrimethylene ether diol also can be prepared by a ring opening polymerization of a cyclic ether, oxetane, as described in J. Polymer Sci., Polymer Chemistry Ed. 28, 449 to 444 (1985) which is also incorporated by reference. The polycondensation of 1,3-propanediol is preferred over the use of oxetane since the diol is a less hazardous, very stable, low cost, commercially available material and can be prepared by use of petro chemical feed-stocks or renewable resources.

Preferably, a bio-route via fermentation of a renewable resource is used to obtain the 1,3-propanediol. One particularly preferred renewable resource is corn since it is readily available and has a high rate of conversion to 1,3-propanediol and can be genetically modified to improve yields to diol. Typical bio-conversion processes are shown in U.S. Pat. No. 5,686,276, U.S. Pat. No. 5,633,362 and U.S. Pat. No. 5,821,092. U.S. Pat. No. '276 teaches a bio-conversion process of a fermentable carbon source to 1,3-propanediol by a single microorganism. U.S. Pat. No. '362 and U.S. Pat. No. '092 show the bio-conversion of glycerol to 1,3-propanediol by recombinant bacteria harboring a foreign gene encoding a diol dehydratase. The aforementioned patents are incorporated herein by reference.

Copolymers of polytrimethylene ether diol also can be used. For example, such copolymers are prepared by copolymerizing 1,3-propanediol with another diol, such as, ethane diol, hexane diol, 2-methyl-1,3-propanediol, 2,2-dimethyl-1,3-propanediol, trimethylol propane and pentaerythritol. At least 50% of the copolymer must be from 1,3-propanediol.

A blend of a high and low molecular weight polytrimethylene ether diols can be used. Also, the diol can contain polytrimethylene ether triols and other higher functionality polytrimethylene ether polyols in an amount of 1 to 20%, by weight, based on the weight of the polytrimethylene ether diol.

Blends of the polytrimethylene ether diol and other cycloaliphatic hydroxyl containing either branched or linear oligomers also can be used. Such oligomers are disclosed in Barsotti, et al. U.S. Pat. No. 6,221,494 which is hereby incorporated by reference. Up to 30% by weight, based on the weight of the binder, of polytrimethylene ether glycol can be used.

Other useful oligomers include alkylene oxide polyester oligomers containing terminal hydroxyl groups which may be made by reacting stoichiometric amounts of a cycloaliphatic monomeric anhydride with a linear or branched polyol in solution at elevated temperatures in the presence of a tin catalyst using standard techniques and then capping the acid oligomers so formed with monofunctional epoxies, particularly alkylene oxide, under pressure above atmospheric but not exceeding about 200 psi and at temperatures of 60-200° C. for 1 to 24 hours. Such alkylene oxide oligomers are well known and described in Barsotti et al. PCT Application No. WO9923131, published May 14, 1999, hereby incorporated by reference.

Cycloaliphatic anhydride monomers, such as, hexahydrophthalic anhydride and methyl hexahydrophthalic anhydride are typically employed in the alkylene oxide oligomers above. Aliphatic or aromatic anhydrides, such as, succinic anhydride or phthalic anhydride may also be used in conjunction with the anhydrides described above. Typically useful linear or branched polyols include, hexanediol, 1,4-cyclohexane dimethanol, trimethylol propane, and pentaerythritol. Useful monofunctional epoxies include alkylene oxides of 2 to 12 carbon atoms. Ethylene, propylene and butylene oxides are preferred although ethylene oxide is most preferred. Other epoxies, such as, Cardura® E-5 or Cardura® E-10 glycidyl ether, supplied by Exxon Chemicals, may be used in conjunction with the monofunctional epoxies described above. Particularly preferred alkylene oxide oligomers are formed from methyl hexahydrophthalic anhydride; either 1,4-cyclohexanedimethanol, trimethylol propane, or pentaerythritol; and ethylene oxide reacted in stoichiometric amounts.

One can also react directly the branched polyols with alkylene oxide and an ether bond is formed between the two constituents.

Compatible blends of any of the aforementioned oligomers can be used as well in the hydroxyl component of the binder.

Hydroxyl component (B) of the binder comprises at least one hydroxyl-terminated component that is either (1) an organic diol having the formula

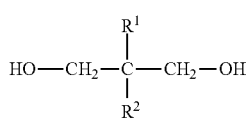

where $R^1$ and $R^2$ are individually selected from the group of hydrogen and an alkyl group having 1,3-5 carbon atoms or (2) a hydroxyl terminated reaction product of trimethylol propane and the hydroxyl component (B) is capable of reacting with the polyisocyanate components to form urethane linkages.

The disubstituted $R^1$ and $R^2$ can be an alkyl group having 1, 3-5 carbon atoms or hydrogen. 1-3 propane diol is a typically useful diol. Also, the alkyl group can be linear or branched. Typically useful linear diols are 2 methyl, 1-3 propane diol, 2 propyl, 1-3 propane diol, 2 pentyl, 1-3 propane diol, and 2,2 dimethyl, 1-3 propane diol and a typical branched diol is 2-tert-butyl, 1-3 propane diol. One particularly preferred diol is 2-methyl, 1-3 propane diol and is supplied by Lyondall Company, Newton Square, Pa.

The reaction product of trimethylol propane (TMP) and a lactone is prepared by reacting TMP and a lactone, preferably caprolactone in a 1:1 to 1:2 molar ratio in a solvent, such as, toluene, in the presence of a catalyst, such as, stannous octoate and/or dibutyl tin dilaurate at an elevated temperature of about 150-220° C. for about 0.5 to 3.0 hours. The 1:1 molar ratio provides a structure having an ideal number average MW=248. This product is available commercially from Dow Chemical Company under the trademark of Tone® 301 having a number average MW=300. Other lactones that can be used to form the reaction product are propiolactone, pivalolactone, butyrolactone, gamma butyrolactone, epsilon-caprolactone, valerolactone, delta valerolactone, laurolactone and the like.

The polyisocyanate component of the binder includes an organic polyisocyanate crosslinking agent or a blend thereof, at least a portion of which comprises a trimer of hexamethylene diisocyanate (HDI) or a trimer of isophorone diisocyanate (IPDI). By "trimer", it is meant that the isocyanate groups have been trimerized to form isocyanurate groups. Typically useful IPDI trimers are sold under the tradenames Desmodur® Z-4470 BA or SN/BA or SN or MPA/X. Typically useful HDI trimers are sold under the tradenames Desmodur® N-3300 or N-3390 or Tolonate® HDT or HDT-LV.

In the present invention, the polyisocyanate component preferably contains to about 50% by weight, more preferably about 15-35% by weight, of the IPDI trimer. Above 50% IPDI trimer, the composition tends to become too brittle and will crack over time. The remainder of the polyisocyanate component preferably contains 50-100% by weight of HDI trimer. More preferably, the polyisocyanate component contains 65-85% by weight of HDI trimer. The total weight percent of the polyisocyanate components equals 100%.

Up to 50% by weight of the polyisocyanate component may be any of the conventional aromatic, aliphatic, cycloaliphatic diisocyanates, trifunctional isocyanates and isocyanate functional adducts of a polyol and a diisocyanate.

Typically useful diisocyanates are 1,6-hexamethylene diisocyanate, isophorone diisocyanate, 4,4'-biphenylene diisocyanate, toluene diisocyanate, bis cyclohexyl diisocyanate, tetramethylene xylene diisocyanate, ethyl ethylene diisocyanate, 2,3-dimethyl ethylene diisocyanate, 1-methyltrimethylene diisocyanate, 1,3-cyclopentylene diisocyanate, 1,4-cyclohexylene diisocyanate, 1,3-pheneylene diisocyanate, 1,5-naphthalene diisocyanate, bis(4-isocyanatocyclohexyl)-methane, 4,4'-diisocyanatodiphenyl ether and the like.

Typical trifunctional isocyanates that can be used are triphenylmethane triisocyanate, 1,3,5-benzene triisocyanate, 2,4,6-toluene triisocyanate and the like.

Isocyanate functional adducts can also be used that are formed from an organic polyisocyanate and a polyol. Any of the aforementioned polyisocyanates can be used with a polyol to form an adduct. Polyols, such as, trimethylol alkanes like trimethylol propane or ethane can be used. One useful adduct is the reaction product of tetramethylxylidene diisocyanate and trimethylol propane and is commercially available as Cythane® 3160.

Polyisocyanates containing heteroatoms in the residue linking the isocyanate groups can be used. Examples of these are polyisocyanates which comprise carbodiimide groups, allophanate groups, isocyanurate groups, urethane groups, acylated urea groups or biuret groups. These polyisocyanates have an isocyanate functionality higher than 2, for example, polyisocyanates of the uretidione or isocyanurate type produced by di- and/or trimerization of the aforementioned diisocyanates.

The coating composition also contains a sufficient amount of catalysts to cure the composition at ambient temperatures. It has been found in the present invention that a combination of certain catalysts in certain specified amounts can effectively accelerate the curing rate of polyisocyanate component at room temperature to achieve the high film hardness offered by IPDI in a relatively short period of time, surprisingly with little or no pot life reductions or die-back in the coating film formed therefrom. Therefore, even at these accelerated curing rates, the coating compositions remain processable for at least 30 minutes at ambient temperatures which provides enough time to complete the refinish job without the need for viscosity adjustments, and the high gloss coating film formed therefrom shows virtually no signs of dying back to a dull fuzzy finish over time.

Specifically, the combined curing catalyst system used in the present invention comprises at least one organotin tin compound, at least one tertiary amine, at least one organic acid in certain specified amounts and optionally, at least one organic acid salt, in particular, zinc and/or calcium organic acid salts.

Typically useful organotin compounds include organotin carboxylates, particularly dialkyl tin carboxylates of aliphatic carboxylic acids, such as, dibutyl tin dilaurate (DBTDL), dibutyl tin dioctoate, dibutyl tin diacetate, and the like. Although not preferred, any of the other customary organotin or organometallic (Zn, Cd, Pb) catalysts could also be used. The amount of organotin catalyst employed in the coating composition can vary considerably depending on the specific binder system and the degree of initial hardness desired. However, it is critical that the coating composition contains enough organotin catalyst to cure the composition at ambient temperatures, while at the same time being insufficient to cause die-back.

Generally, about 0.005-0.2% by weight, based on the weight of the binder, of organotin catalyst will be sufficient to impart the desired properties. It has been found that above the upper limit of 0.2% by weight, the curing reaction is too fast and die-back results. Below about 0.005% by weight, the curing reaction is too slow and insufficient hardness and poor mechanical properties develop.

Typically useful tertiary amines or co-catalyst include tertiary aliphatic monoamines or diamines, particularly trialkylene diamines, such as, triethylene diamine (DABCO), N-alkyl trimethylenediamine, such as, N,N,N'-trimethyl-N'- tallow-1,3-diaminopropane, and the like; and trialkylamines, such as, tridodecylamine, trihexadecylamine, N,N'-dimethylalkyl amine, such as, N,N'-dimethyldodecyl amine, and the like. The alkyl or alkylene portions of these amines may be linear or branched and may contain 1-20 carbon atoms. Especially preferred are amines that contain at least 6 carbon atoms in at least one of their alkyl or alkylene portions to lower the hazing in humid conditions.

As with the amount of organotin compound, the amount of tertiary amine employed in the coating composition can vary considerably; it being required only that tertiary amine be present in an amount which, together with the above, will cause the composition to cure at ambient temperatures in under 2 hours. Generally, about 0.01-1% by weight, based on the weight of the binder, of tertiary amine will be sufficient to impart the desired properties. Above the upper limit of about 1%, the tertiary amine offers longer dust drying times and provides the film with insufficient hardness. Below about 0.01% by weight, the catalytic effect is inadequate.

An organic acid is also included in the catalyst system for increased pot life. A pot life of at least 30 minutes at ambient temperatures is generally sufficient for completion of a refinish job. Typically useful acid catalysts are formic acid, acetic acid, propionic acid, butanoic acid, hexanoic acid, and any other aliphatic carboxylic acid, and the like. Generally, about 0.005-1% by weight, based on the weight of the binder, of acid catalyst is employed.

Calcium and zinc organic acid salts are optionally included in the catalyst system. Typically useful are calcium acetate, zinc acetate, calcium oxalate, zinc oxalate, calcium adipate, zinc adipate, zinc oxylate, zinc naphthenate and the like. Generally, when used, about 0.0001-1% by weight, based on the weight of the binder, of the calcium and/or zinc organic acid salt is used.

It has been found that the catalyst package described above offers a higher cure response than tin, amine, acid or acid salt alone particularly in the presence of IPDI trimers.

To improve weatherability of the composition about 0.1-10% by weight, based on the weight of the binder, of ultraviolet light stabilizers screeners, quenchers and antioxidants can be added. Typical ultraviolet light screeners and stabilizers include the following:

Benzophenones, such as, hydroxy dodecyloxy benzophenone, 2,4-dihydroxy benzophenone, hydroxy benzophenones containing sulfonic acid groups and the like.

Benzoates, such as, dibenzoate of diphenylol propane, tertiary butyl benzoate of diphenylol propane and the like.

Triazines, such as, 3,5-dialkyl-4-hydroxyphenyl derivatives of triazine, sulfur containing derivatives of dialkyl-4-hydroxy phenyl triazine, hydroxy phenyl-1,3,5-triazine and the like.

Triazoles, such as, 2-phenyl-4-(2,2'-dihydroxy benzoyl)-triazole, substituted benzotriazoles, such as, hydroxy-phenyltriazole and the like.

Hindered amines, such as, bis(1,2,2,6,6 entamethyl-4-piperidinyl sebacate), di[4(2,2,6,6, tetramethyl piperidinyl)]sebacate and the like and any mixtures of any of the above.

Generally, flow control agents are used in the composition in amounts of about 0.1-5% by weight, based on the weight of the binder, such as, polyacrylic acid, polyalkylacrylates, polyether modified dimethyl polysiloxane copolymer and polyester modified polydimethyl siloxane.

When used as a clear coating, it may be desirable to use pigments in the clear coating composition which have the same refractive index as the dried coating. Typically, useful pigments have a particle size of about 0.015-50 microns and are used in a pigment to binder weight ratio of about 1:100 to 10:100 and are inorganic siliceous pigments, such as, silica pigment having a refractive index of about 1.4-1.6.

The coating composition of the present invention also contains the customary organic solvents in the organic liquid carrier portion. As previously described, the amount of organic solvent(s) added depends upon the desired binder level as well as the desired amount of VOC of the composition. Typical organic solvents consist of aromatic hydrocarbons, such as, petroleum naphtha or xylenes; ketones, such as, methyl amyl ketone, methyl isobutyl ketone, methyl ethyl ketone, or acetone; esters, such as, butyl acetate or hexyl acetate; and glycol ether esters, such as, propylene glycol monomethyl ether acetate. Examples of solvents, which do not contribute to the VOC of the composition, include methyl acetate, acetone, 1-chloro, 4-trifluoromethyl benzene, and potentially t-butyl acetate.

Generally, the coating composition of this invention is used as a clear coat in automotive refinishing. Also, the coating composition can contain pigments to provide a mono-coat, base coat, sealer coat, primer, primer surfacer or other pigmented coating composition. Pigments are added to the coating composition in a pigment to binder ratio of about 0.1:100 to 300:100 as are commonly used for the aforementioned compositions. Pigments typically are formulated into mill bases compatible with the coating composition and are added in the desired amount. Pigments used are those that are typically used for the aforementioned compositions and are well known to those skilled in the art.

The coating composition of this invention is preferably prepared as a "two-component" or "two-pack" coating composition, wherein the two reactive binder components are stored in separate containers, which are typically sealed. The catalyst, organic solvent, and usual other additives may be added to either or both the hydroxyl or crosslinking components, depending upon the intended use of the composition. However, these additives (except for some solvent) are preferably added to and stored in the same container with the hydroxyl component. The contents of the hydroxyl and isocyanate component containers are mixed in the desired NCO/OH ratio just prior to use to form the activated coating composition, which has a limited pot life. Mixing is usually accomplished simply by stirring at room temperature just before application. The coating composition is then applied as a layer of desired thickness on a substrate surface, such as an autobody. After application, the layer dries and cures to form a coating on the substrate surface having the desired coating properties.

In the application of the coating composition as a clear coat refinish to a vehicle such as an automotive or a truck, the basecoat, which may be either a solvent based composition or a waterborne composition, is first applied and then dried to at least remove solvent or water before the clear coat is applied usually wet-on-wet by conventional spraying. Electrostatic spraying also may be used. In refinish applications, the composition is preferably dried and cured at ambient temperatures but can be forced dried and cured in paint booths equipped with heat sources at slightly elevated booth temperatures of, in general, about 30-100° C., preferably, about 35-65° C., for a short time of about 3-30 minutes, preferably about 5-15 minutes. The coating so formed is typically about 0.5-5 mils thick.

In these refinish applications, in particular, the clear coat of this invention has been found to greatly improve the productivity of a refinish operation. Through incorporation of a mixture of polyacrylic resin, optional oligomers, NCO trimer, and the catalyst system, the composition when used as a clear coat dries and cures in a relatively short time after application to a dust free, water resistant, and sufficiently hard state for sanding (wet or dry) or buffing, unexpectedly with minimum pot life reductions and die-back consequences, which allows the vehicle to be buffed, moved out of the way, and delivered to the customer on the same day of application, in comparison to the next day offered by conventional. The composition of this invention, in particular, exhibits a pot life of at least 30 minutes at ambient temperature, dust free time within 20 minutes at ambient temperatures, and water spot free and sand or buff time within 2 hours at ambient temperatures or within 0.5-1.5 hours when near the high end of the organo-tin catalyst range. The foregoing properties can be achieved much faster by curing the composition at slightly elevated temperatures of, in general, about 55-65° C. peak substrate temperature for about 3-10 minutes, and preferably about 60° C. for about 6 minutes, which remarkably allows the clear finish to be sanded or buffed immediately on cool down. Furthermore, the finish remains sandable or buffable for several days up to one week before it cures to a tough, hard durable exterior automotive finish.

The coating composition of this invention can be used to paint or repair a variety of substrates, such as, previously painted metal substrates, cold roll steel, steel coated with conventional primers, such as, electrodeposition primers, alkyd resin repair primers and the like, plastic type substrates such as polyester reinforced fiber glass, reaction injection molded urethanes and partially crystalline polyamides, as well as wood and aluminum substrates.

The present invention is further defined in the following Examples. It should be understood that these Examples are given by way of illustration only. From the above discussion and these Examples, one skilled in the art can ascertain the essential characteristics of this invention, and without departing from the spirit and scope thereof, can make various changes and modifications of the invention to adapt it to various uses and conditions. As a result, the present invention is not limited by the illustrative examples set forth herein below, but rather is defined by the claims contained herein below.

The following examples illustrate the invention. All parts and percentages are on a weight basis unless otherwise indicated. All molecular weights are determined by GPC using a polymethyl methacrylate standard.

EXAMPLES

Example 1

In this example, here is a comparison of clear-coat compositions (1) and (2) of this invention to a prior art clear-coat composition (3).

Hydroxyl Acrylic Polymer 1

A hydroxyl-containing acrylic polymer solution was prepared by charging the following constituents into a reactor equipped with a thermocouple, a heating mantle, a mechanical stirrer, addition funnel, nitrogen purge, and a reflux condenser:

| Ingredients | Parts by Weight |
| --- | --- |
| Portion 1 | |
| Xylene | 57 |
| Portion 2 | |
| Methyl ethyl ketone | 10 |
| Styrene monomer | 15 |
| Isobutyl methacrylate monomer | 45 |
| Methyl methacrylate monomer | 20 |
| Hydroxy ethyl methacrylate monomer | 20 |
| Portion 3 | |
| T-butyl peracetate solution (75% solids in mineral spirits) | 3 |
| Total | 170 |

Portion 1 was added to the reactor and heated to its reflux temperature. Portions 2 and 3 were then added together at a uniform rate to the reactor over a three hour period while the resulting reaction mixture was maintained at its reflux temperature. The reaction mixture was held at reflux for an additional hour. The resulting acrylic polymer solution had a polymer solids content of about 60%. The polymer had a weight average molecular weight (Mw) of about 10,500 and a glass transition temperature (Tg) of about 58° C.

Hydroxyl Acrylic Polymer 2

A hydroxyl-containing acrylic polymer solution was prepared by charging the following constituents into a reactor equipped as described above.

| Ingredients | Parts by Weight |
| --- | --- |
| Portion 1 | |
| Xylene | 55 |
| Portion 2 | |
| Methyl ethyl ketone | 10 |
| Styrene monomer | 15 |
| Methyl methacrylate monomer | 5 |
| Isobutyl methacrylate monomer | 32 |
| Isobornyl methacrylate monomer | 23 |
| 2-ethyl hexyl methacrylate monomer | 5 |
| Hydroxy ethyl methacrylate monomer | 20 |
| Portion 3 | |
| T-butyl peracetate solution (75% solids in mineral spirits) | 2.5 |
| Total | 167.5 |

Portion 1 was added to the reactor and heated to its reflux temperature. Portions 2 and 3 were then added together at a uniform rate to the reactor over a three hour period while the resulting reaction mixture was maintained at its reflux temperature. The reaction mixture was held at reflux for an additional hour. The resulting acrylic polymer solution had a polymer solids content of about 60%. The polymer had a weight average molecular weight (Mw) of about 8,500 and a glass transition temperature (Tg) of about 55° C.

Hydroxyl Acrylic Polymer 3

| Ingredients | Parts by Weight |
| --- | --- |
| Portion 1 | |

-continued

| Ingredients | Parts by Weight |
| --- | --- |
| Xylene | 58 |
| Portion 2 | |
| Butyl acetate | 7 |
| Styrene monomer | 20 |
| Hydroxy propyl methacrylate monomer | 16 |
| Isobornyl methacrylate monomer | 30 |
| 2-ethyl hexyl methacrylate monomer | 18 |
| Hydroxy ethyl methacrylate monomer | 16 |
| Portion 3 | |
| T-butyl peracetate solution (75% solids in mineral spirits) | 6.5 |
| Total | 171.5 |

Portion 1 was added to the reactor and heated to its reflux temperature. Portions 2 and 3 were then added together at a uniform rate to the reactor over a three hour period while the resulting reaction mixture was maintained at its reflux temperature. The reaction mixture was held at reflux for an additional hour. The resulting acrylic polymer solution had a polymer solids content of about 60%. The polymer had a weight average molecular weight (Mw) of about 5000 and a glass transition temperature (Tg) of about 47° C.

Alkylene Oxide Polyester Oligomer (Prior Art)

A tetrahydroxyl-terminated ethylene oxide based polyester oligomer was prepared by charging the following into a reaction vessel rated for high pressure:

| | Grams |
| --- | --- |
| Portion 1 | |
| Propylene glycol monomethyl ether acetate | 420.00 |
| Pentaerythritol | 136.00 |
| Triethylene amine | 000.23 |
| Portion 2 | |
| Methylhexahydrophthalic anhydride | 645.00 |
| Total | 1201.23 |

Portion 1 was charged into the reaction vessel and heated to 140° C. Portion 2 was then added over one hour and the batch was then held at 140° C. for 6 hours. The batch was then cooled to 25° C., The pressure vessel was then sealed and 173 grams of ethylene oxide (EO) was added and the batch was heated to 110° C. and held at that temperature for 6 hours. Excess ethylene oxide was removed by purging the batch with nitrogen. The acid number on the solids was less than 10 mg KOH/gram. The resulting oligomer solution had a 80% solids content. The oligomer had all primary hydroxyl functionality, a Mw of about 1,000, a Tg of about 0.° C. and a polydispersity (Pd) of about 1.1.

TMP/Caprolacton Oligomer (the Invention)

To a reactor equipped with a condenser, a stirrer, a water separation trap with toluene condensate return and under nitrogen blanket, 2593 g of trimethyol propane (TMP) and 136 g. of toluene were added. The reactor is maintained at 190° C. for 30 minutes. The purpose is to remove the water present in the TMP. The reactor is cool down to 100° C. and 2206 g of caprolactone, 9.6 g of 1% solution of stannous octoate in methylamyl ketone and 11.6 g of 10% solution of dibutyltin dilaurate in methylamyl ketone were added. It is heated again to 190.° C. and held for 3 hours. Then cooled down to 80.° C. Then 1044 g of ethyl acetate was added under mixing. Then it is filtered at ambient temperature. The solids was about 77%.

2-Methyl, 1-3 propane diol (the invention)

2-Methyl, 1-3 propane diol was obtained from Lyondell Company under the trade name of MP-diol and is 100% solids.

Crosslinking Agents

Desmodur® N-3300 from Bayer Co. is a 1,6-hexamethylene diisocyanate trimer

Desmodur® Z-4470 BA from Bayer Co. is a 70% solids isophorone diisocyanate trimer in butyl acetate.

Preparation of Clear Coating Compositions 1, 2 and 3

Each of the coating compositions are two components systems. The first component is a clear and the second is an NCO activator.

The clear component was made according to the following Table 1:

TABLE 1

| CLEAR (all in gr.) | 1 | 2 | 3 |
| --- | --- | --- | --- |
| TMP/Caprolactone Oligomer (prepared above) | 12.99 | 0 | 0 |
| 2-Methyl, 1-3 propane diol | 0 | 10.00 | 0 |
| Alkylene oxide polyester oligomer (prepared above) | 0 | 0 | 12.50 |
| Hydroxyl Acrylic Polymer 1 (prepared above) | 83.89 | 83.89 | 83.89 |
| Hydroxyl Acrylic Polymer 2 (prepared above) | 66.23 | 66.23 | 66.23 |
| Tinuvin ®-384* | 1.80 | 2.10 | 1.57 |
| 10% of acetic acid in methyamylketone | 6.59 | 7.66 | 5.75 |
| Tinuvin ®-292* | 1.71 | 1.99 | 1.49 |
| BYK-333 (described below) | 0.17 | 0.20 | 0.15 |
| 10% of N.N Dimethyl dodecylamine in methylamylketone | 7.45 | 8.66 | 6.50 |
| BYK-358 (described below) | 1.37 | 1.59 | 1.20 |
| 2% DBTDL in methyamylketone | 5.14 | 5.97 | 4.48 |
| Methylisobutylketone | 2.00 | 2.00 | 2.00 |
| Methylamylketone | 5.00 | 5.00 | 5.00 |
| N butyl acetate | 8.00 | 8.00 | 8.00 |
| Xylene | 5.00 | 5.00 | 5.00 |
| Total | 207.34 | 208.29 | 203.76 |

BYK 358 and BYK 333 are additive solution of polyacrylic and polyether modified di-methylpolysiloxane copolymer, respectively sold by BYK-Chemie USA (524 South Cherry Street, Wallingford, Conn. 06492).

DBTDL—dibutyl tin dilaurate

*Tinuvin® 292 and 384 sold by Ciba Specialty Chemicals-USA

The activator is made according to the following Table 2

TABLE 2

| ACTIVATOR (in grams) | 1 | 2 | 3 |
| --- | --- | --- | --- |
| Desmodur ® N3300 (described above) | 49.87 | 69.35 | 34.57 |
| Desmodur ® Z-4470 BA (described above) | 30.53 | 42.46 | 21.16 |
| Methylisobutylketone | 7.22 | 9.83 | 5.45 |
| Methylamylketone | 18.05 | 24.58 | 13.63 |
| N butyl acetate | 28.88 | 39.32 | 21.80 |
| Xylene | 18.05 | 24.58 | 13.63 |
| Total | 152.60 | 210.12 | 110.24 |

Each of the Coating Compositions 1-3 were activated by mixed all the clear with the corresponding activator. Each of the final activated clears have the NCO/OH index is about 1.4. and the VOC (volatile organic content) is about 4.2 lb./gal. (0.5 kg/l).

Each of the activated clear coating compositions was sprayed on a cold roll steel panels at 25° C. and were all air dried at ambient temperature. After a specific time such as 2 hr, 4 hr or 24 hrs, the film is subjected to the following tests and the results of these test are shown in the following Table 3:

1) Pot Life

The pot life test is to measure the initial viscosity at the spray time and how long its takes to pass the certain viscosity. In this case, it is 20 sec. In the following Table 3, Coating Composition 3 reached the 20 sec mark faster than Coating Compositions 1 and 2 of this invention. This shows that the pot life of Coating Composition 3 is shorter or less desirable in comparison to Coating Compositions 1 and 2.

2) Water Spot

The test consisted of placing deionized water drops every half hour onto the panels while it dries in the airs. Then after letting the water standing for 24 hours, the coating is observed to determine if it is damage and if damaged how severe the damage is. The scale is 1 to 10. One being completely damage. A value of 10 is free of defects and below 9 some defects are noted. Table 3 shows that Coating Composition 3 is not water spot free after 2.0 hours, while Coating Compositions 1 and 2 candidates are spot free after 2.0 hours.

3) Swell Ratio

Swell ratio measured the network formation or the cure rate. After a certain length of time, the film is cut into a circle and in treated with methylene chloride. The solvent will swell the network to a larger circle. A completely cured network will be swollen less than the partially cured network. The ratio of the square of the ratio swollen/initial diameter of the circle indicate the cure rate. The smaller the ratio, the better the network is formed. From Table 3, Coating Composition 3 had the highest value, while Coating Compositions 1 and 2 (the invention) have the lowest whether measured after 3 hr or 5 hr or 1 day.

4) Gel Fraction

Gel fraction is the measurement of the total network formation, beside the additive. The value should reach 95%. From the data, Coating Compositions 1-3 all formed the desired network 5) Persoz Hardness Once the film or network is formed, the hardness should be adequate, the higher the better. It is measure on how long the pendulum can swing on the surface of the film. A wet or non cure film would have a value of ZERO or a few units, while a cured film would have value as high as 250. The cured film alone must have a Persoz hardness of at least 35 counts, preferably, in the range of about 40-150 counts, at a film thickness of 2.2 mils when measured on a previously uncoated cold rolled steel (Q) panel before it can be sanded, buffed or polished. Persoz hardness is determined by a GARDCO® Pendulum Hardness Tester Model HA-5854 manufactured by BYK Chemie, Germany and sold by Paul N. Gardness Company, Inc. Pompano Beach, Fla. From the Table 3, Coating Composition 3 has the lowest Persoz hardness, while Coating Compositions 1 and 2 (the invention) have the highest values.

TABLE 3

| Coating Compositions | | 1 | 2 | 3 |
|---|---|---|---|---|
| Potlife @ Ambient | | | | |
| 0 hr | SEC | 17 | 15 | 18 |
| 1 hr | SEC | 19 | 18 | 20 |
| Waterspot @ Ambient | | | | |
| 1.5 hr | | 9.7 | 10 | 8.8 |
| 2 hr | | 10 | 10 | 9.7 |
| Swell Ratio | | | | |
| 2.75 hr | | 2.27 | 2.34 | 2.45 |
| 4.75 hr | | 2.03 | 2.06 | 2.10 |
| 1 DAY | | 1.67 | 1.70 | 1.77 |
| Gel Fractions | % | 95.5 | 96.2 | 94.8 |
| Persoz Hardness | | | | |
| 1 Day | | 156 | 145 | 128 |

Preparation of Clear Coating Compositions 4, 5 and 6

Each of the coating compositions are two components systems. The first component is a clear and the second is an NCO activator.

The clear component was made according to the following Table 4:

TABLE 4

| CLEAR (all in gr.) | 4 | 5 | 6 |
|---|---|---|---|
| TMP/Caprolactone Oligomer (prepared above) | 20.83 | 20.83 | 20.83 |
| Hydroxyl Acrylic Polymer 3 (prepared above) | 40.32 | 40.32 | 40.32 |
| Hydroxyl Acrylic Polymer 1 (prepared above) | 50.34 | 50.34 | 50.34 |
| Hydroxyl Acrylic Polymer 2 (prepared above) | 49.67 | 49.67 | 49.67 |
| Tinuvin ®-384 (described above) | 1.50 | 1.89 | 1.89 |
| 10% of acetic acid in methyamylketone | 5.50 | 6.90 | 6.90 |
| Tinuvin ®-292 (described above) | 1.43 | 1.80 | 1.80 |
| BYK-333 (described above) | 0.14 | 0.18 | 0.18 |
| 10% of N.N Dimethyl dodecylamine in methylamylketone | 6.20 | 7.80 | 7.80 |
| BYK-358 (described above) | 1.14 | 1.43 | 1.43 |
| 2% DBTDL in methyamylketone | 4.28 | 5.37 | 5.37 |
| Methylisobutylketone | 2.23 | 2.81 | 2.81 |
| Methylamylketone | 5.59 | 7.02 | 7.02 |
| N butyl acetate | 8.95 | 11.24 | 11.24 |
| Xylene | 5.59 | 7.02 | 7.02 |
| Total | 203.71 | 214.62 | 214.62 |

The activator is made according to the following Table 5

TABLE 5

| ACTIVATOR (in grams) | 4 | 5 | 6 |
|---|---|---|---|
| Desmodur ® N3300 (described above) | 42.59 | 79.1 | 60.02 |
| Desmodur ® Z-4470 BA (described above) | 0 | 0 | 36.75 |
| Methylisobutylketone | 7.06 | 10.43 | 9.94 |
| Methylamylketone | 17.64 | 26.07 | 24.85 |
| N butyl acetate | 28.23 | 41.72 | 39.76 |
| Xylene | 17.64 | 26.07 | 24.85 |
| Total | 113.16 | 183.39 | 196.17 |

Each of the activated clear coating compositions was sprayed on cold roll steel panels at 25° C. and were all air dried at ambient temperature. The NCO index is about 0.7 for candidates 4 and 1.3 for candidates 5 and 6. After a specific time such as 2.5 hr, 4.5 hr or 24 hrs, the film and the ready to spray clear are subjected to the following tests and the results of the tests are shown in following Table 6:

6) Pot Life

The pot life test is to measure the initial viscosity at the spray time and how long its takes to pass the certain viscosity. In this case, they are well below 20 sec.

7) Swell ratio

Swell ratio measured the network formation or the cure rate. The smaller the ratio, the better the network is formed. From Table 6, Coating Composition 4 had the highest value, while Coating Compositions 5 and 6 (the invention) have the lowest whether measured after 3 hr or 5 hr.

8) Persoz Hardness

From the Table 6, Coating Composition 4 has the lowest Persoz hardness, while Coating Compositions 5 and 6 (the invention) have the highest values. Coating 6 with the highest hardness is due to the presence of the IPDI trimer, while coating 5 and 4 do not have it. This example showed that the presence of IPDI trimer is beneficial to the early hardness development.

9) Gel Fraction

The value should reach 95%. From the data, Coating Compositions 5 and 6 all formed the desired network. Coating 4 has only 92%. The reason is because the NCO index is only 0.7 for coating 4 while they are 1.3 for coatings 5 and 6.

TABLE 6

| Coating Compositions | | 4 | 5 | 6 |
|---|---|---|---|---|
| Potlife @ Ambient | | | | |
| 0 hr | SEC | 15 | 14 | 14 |
| 1 hr | SEC | 17 | 16 | 17 |
| Swell Ratio Ambient | | | | |
| 2.5 hr | | 2.3 | 1.96 | 1.91 |
| 4.5 hr | | 2.1 | 1.82 | 1.81 |
| 1 DAY | | 1.92 | 1.63 | 1.61 |
| Persoz Hardness | SEC | | | |
| 2.5 HR-Air Dry | | 32 | 47 | 53 |
| Gel Fraction | % | 92 | 97 | 98 |

Various modifications, alterations, additions or substitutions of the components of the compositions of this invention will become apparent to those skilled in the art without departing from the spirit and scope of this invention. This invention is not limited by the illustrative embodiments set forth herein, but rather is defined by the following claims.

The invention claimed is:

1. A process for repairing a clear coat of a clear coat/color coat coating composition which comprises applying a layer of a clear coating composition to the clear coat and curing the layer of the applied clear coating composition, wherein, said clear coating composition contains a film forming binder and a volatile organic liquid carrier for the binder, wherein the film forming binder contains:

(A) a hydroxyl polymer component comprising at least one hydroxyl-containing acrylic polymer;

(B) at least one hydroxyl-terminated component selected from the group consisting of (1) an organic diol having the formula

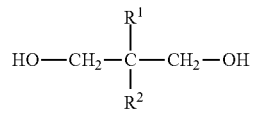

where $R^1$ and $R^2$ are individually selected from the group consisting of hydrogen and an alkyl group having 1, 3-5 carbon atoms and (2) a hydroxyl terminated reaction product of trimethylol propane and a lactone; and (C) an organic polyisocyanate component, at least a portion of which comprises a trimer selected from the group consisting of a trimer of isophorone diisocyanate and a trimer of hexamethylene diisocyanate and any mixtures thereof, wherein the organic polyisocyanate component further comprises at least one of an asymmetric hexamethylene diisocyanate trimer, a biuret of hexamethylene diisocyanate, a biuret of isophorone diisocyanate and any mixtures thereof;

wherein the ratio of equivalents of isocyanate per equivalent of hydroxyl groups in the binder is in the range of about 0.7/1 to 2.0/1; and wherein the clear coating composition further contains (D) a catalyst system for the binder comprising
  (i) at least one organotin compound,
  (ii) at least one tertiary amine,
  (iii) at least one organic carboxylic acid; and
  (iv) optionally, at least one organic acid salt selected from the group consisting of zinc organic acid salts and calcium organic salts;

wherein the clear coating composition cures at ambient temperatures to a water spot free state within 2 hours after application;

wherein the hydroxyl containing acrylic polymer comprises 5 to 50% by weight, based on the weight of the acrylic polymer, of a hydroxyl acrylic polymer having a weight average molecular weight of above 10,000 to 20,000, 20-60% by weight, based on the weight of the acrylic polymer, of a hydroxyl acrylic polymer having a weight average molecular weight of above 7,000 and up to 10,000 and 20-70% by weight by weight, based on the weight of the acrylic polymer, of a hydroxyl acrylic polymer having a weight average molecular weight of 2,000 up to 7,000.

2. A process for repairing a pigmented mono-coat finish which comprises applying a layer of a pigmented coating composition to the mono coat finish and curing the layer of the applied pigmented coating composition, wherein, said pigmented coating composition contains a film forming binder, one or more pigments and a volatile organic liquid carrier for the binder, wherein the film forming binder contains:

(A) a hydroxyl polymer component comprising at least one hydroxyl-containing acrylic polymer;

(B) at least one hydroxyl-terminated component selected from the group consisting of (1) an organic diol having the formula

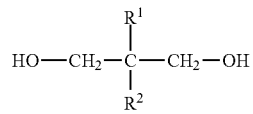

where $R^1$ and $R^2$ are individually selected from the group consisting of hydrogen and an alkyl group having 1, 3-5 carbon atoms and (2) a hydroxyl terminated reaction product of trimethylol propane and a lactone; and (C) an organic polyisocyanate component, at least a portion of which comprises a trimer selected from the group consisting of a trimer of isophorone diisocyanate and a trimer of hexamethylene diisocyanate and any mixtures thereof, wherein the organic polyisocyanate component further comprises at least one of an asymmetric hexamethylene diisocyanate trimer, a biuret of hexamethylene diisocyanate, a biuret of isophorone diisocyanate and any mixtures thereof;

wherein the ratio of equivalents of isocyanate per equivalent of hydroxyl groups in the binder is in the range of about 0.7/1 to 2.0/1;

and wherein the pigmented coating composition further contains (D) a catalyst system for the binder comprising
  (i) at least one organotin compound,
  (ii) at least one tertiary amine,
  (iii) at least one organic carboxylic acid; and
  (iv) optionally, at least one organic acid salt selected from the group consisting of zinc organic acid salts and calcium organic salts;

wherein the one or more pigments are present in the pigmented coating composition in a pigment to binder weight ratio in a range of from about 0.1:100 to 300:100;

wherein the pigmented coating composition cures at ambient temperatures to a water spot free state within 2 hours after application;

wherein the hydroxyl containing acrylic polymer comprises 5 to 50% by weight, based on the weight of the acrylic polymer, of a hydroxyl acrylic polymer having a weight average molecular weight of above 10,000 to 20,000, 20-60% by weight, based on the weight of the acrylic polymer, of a hydroxyl acrylic polymer having a weight average molecular weight of above 7,000 and up to 10,000 and 20-70% by weight by weight, based on the weight of the acrylic polymer, of a hydroxyl acrylic polymer having a weight average molecular weight of 2,000 up to 7,000.

* * * * *